(12) United States Patent
Cho et al.

(10) Patent No.: US 9,526,082 B2
(45) Date of Patent: Dec. 20, 2016

(54) METHOD AND APPARATUS FOR ESTIMATING LOCATION OF PEDESTRIAN USING STEP LENGTH ESTIMATION MODEL PARAMETERS

(71) Applicant: ELECTRONICS AND TELECOMMUNICATIONS RESEARCH INSTITUTE, Daejeon (KR)

(72) Inventors: Young-Su Cho, Seoul (KR); Myung-In Ji, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 380 days.

(21) Appl. No.: 13/843,749

(22) Filed: Mar. 15, 2013

(65) Prior Publication Data

US 2013/0273939 A1    Oct. 17, 2013

(30) Foreign Application Priority Data

Apr. 13, 2012  (KR) .......................... 10-2012-0038390
Sep. 7, 2012  (KR) .......................... 10-2012-0099256

(51) Int. Cl.
| | |
|---|---|
| H04W 24/00 | (2009.01) |
| H04W 64/00 | (2009.01) |
| G01S 5/02 | (2010.01) |
| G01C 21/16 | (2006.01) |
| G01C 22/00 | (2006.01) |

(52) U.S. Cl.
CPC ............ H04W 64/00 (2013.01); G01C 21/165 (2013.01); G01C 22/006 (2013.01); G01S 5/0257 (2013.01)

(58) Field of Classification Search
CPC .................. H04W 4/003; H04W 4/02–4/043; G06F 17/30241; G06F 17/30873
USPC .......................... 455/456.1–457; 701/400–541
See application file for complete search history.

(56) References Cited

U.S. PATENT DOCUMENTS

| 8,831,909 | B2* | 9/2014 | Li et al. ......................... 702/160 |
| 2005/0136942 | A1* | 6/2005 | Timiri .................. H04W 64/00 455/456.1 |
| 2006/0184320 | A1* | 8/2006 | Hong ............................. 701/209 |
| 2007/0208532 | A1* | 9/2007 | Park ....................... A61B 5/1112 702/158 |

(Continued)

FOREIGN PATENT DOCUMENTS

| JP | 2009-229204 A | 10/2009 |
| KR | 10-2006-0090913 A | 8/2006 |

(Continued)

*Primary Examiner* — San Htun (57) ABSTRACT

Disclosed herein is a method and apparatus for estimating the location of a pedestrian using step length estimation model parameters. In the method of estimating a location of a pedestrian according to the present invention, mobile User Equipment (UE) having sensors generates positioning measurement information. The mobile UE requests positioning assistance information from a positioning server. The positioning server generates the positioning assistance information. The positioning server provides the positioning assistance information to the mobile UE. The mobile UE performs location estimation of the pedestrian using the positioning measurement information and the positioning assistance information.

9 Claims, 6 Drawing Sheets

(56) References Cited

U.S. PATENT DOCUMENTS

| | | | |
|---|---|---|---|
| 2008/0109164 A1* | 5/2008 | Matsunaga | G01C 21/3647 |
| | | | 701/431 |
| 2008/0120062 A1 | 5/2008 | Lee et al. | |
| 2009/0192708 A1 | 7/2009 | Yoo et al. | |
| 2012/0006112 A1* | 1/2012 | Lee | G01C 22/006 |
| | | | 73/504.02 |

FOREIGN PATENT DOCUMENTS

| | | |
|---|---|---|
| KR | 10-2009-0022829 A | 3/2009 |
| KR | 10-2009-0082711 A | 7/2009 |

* cited by examiner

METHOD AND APPARATUS FOR ESTIMATING LOCATION OF PEDESTRIAN USING STEP LENGTH ESTIMATION MODEL PARAMETERS

CROSS REFERENCE TO RELATED APPLICATIONS

This application claims the benefit of Korean Patent Application Nos. 10-2012-0038390 filed on Apr. 13, 2012 and 10-2012-0099256 filed on Sep. 7, 2012, which are hereby incorporated by reference in their entireties into this application.

BACKGROUND OF THE INVENTION

1. Technical Field

The present invention relates generally to Pedestrian Dead Reckoning (PDR) and, more particularly, to a method and apparatus that receive step length estimation model parameters from a server and utilize the parameters when a terminal (user equipment: UE) including sensors, such as an accelerometer, a gyroscope, and a magnetometer, calculates its location through PDR for estimating a step count, a step length, and direction (heading) information using the sensors, thus promptly and accurately providing location information immediately upon receiving a location request, without requiring an additional calibration operation in the user equipment. Further, the present invention relates to a method by which the user equipment including sensors provides sensor measurement information per step to the server.

2. Description of the Related Art

In future mobile communication services, it will be very important to accurately and reliably determine the absolute or relative location of mobile communication user equipment (UE). In particular, in the case of precise positioning methods, such as the E-911 (Enhanced 9-1-1) service in the United States, there are increased needs for methods which serve commercial purposes, disaster management purposes, such as for emergency relief, or military application purposes.

Mobile carriers or UE manufacturers have conducted research into technology for providing precise positioning regardless of the environment of users of UE. In particular, Pedestrian Dead Reckoning (PDR) is a positioning method that may be usefully utilized in an environment in which a Global Positioning System (GPS) and a mobile communication infrastructure are not present, or in which location accuracy is deteriorated upon performing positioning based on the corresponding infrastructure.

PDR is a method of providing relative location information, but if an absolute location at a point in time when positioning is performed is known, absolute locations may be continuously provided based on the absolute location. Generally, PDR is configured to estimate distance, heading, etc. per walking step using measurement information obtained from the accelerometer, gyroscope, magnetometer (digital compass), etc. of UE used by a pedestrian. Typically, distance per walking step is obtained using a step length, and heading per walking step is obtained using either the orientation information of the magnetometer or information obtained by integrating angular velocity output of the gyroscope.

PDR is divided into a step estimation procedure for estimating a step count (the number of steps) and a step length, and a heading estimation procedure for estimating the heading.

The step estimation procedure is subdivided into a procedure for estimating a step count using a maximum value, a minimum value, a variance, etc. of the output value of the accelerometer per walking step and a procedure for estimating a step length indicating a movement distance between continuous steps. In particular, in the case of the procedure for estimating a step length, when a location error occurs, the location error is continuously accumulated as walking continues, and so the accuracy of the step length is very important in precise positioning. Generally, a step length is influenced by the motional state of a pedestrian (for example, slow walking, quick walking, slow running, quick running, climbing up, climbing down, ascending stairs, descending stairs, etc.) or motional characteristics such as height, gender, and walking features (for example, straight line walking or out-toed gait). Therefore, in order to exactly reflect the characteristics of a pedestrian, off-line calibration is required which calibrates an estimated step length while moving in a designated interval or between reference locations before positioning is started.

In an environment in which an absolute location can be provided by an outdoor Global Positioning System (GPS) or an indoor WiFi infrastructure, on-line calibration may also be performed by applying the corresponding location information to a step length estimation procedure.

In a heading estimation procedure, the heading of the UE is estimated using the output value of a magnetometer or a gyroscope. Since these two types of sensors have contrary measurement characteristics, they may be complementarily operated to improve the accuracy of heading information.

That is, the magnetometer has an advantage of providing absolute orientation, but reacts sensitively to a surrounding environment influencing the gyroscope, and thus a large error may occur. Meanwhile, since the gyroscope outputs angular velocity information, it reacts promptly to a sudden heading change of a pedestrian, but has a disadvantage of increasing an error in heading information as a step count increases, because relative orientation is estimated using integral calculus.

Generally, when off-line calibration is applied to a step length estimation procedure, there is inconvenience in that the user of normal UE must perform a separate calibration procedure so as to use location information. For such calibration, the location of a designated interval or reference locations must be accurately known, and then the convenience of service usage is deteriorated. Further, when on-line calibration is applied, there is a disadvantage in that it is difficult to receive GPS signals, and in that in an indoor environment in which a wireless communication infrastructure, such as a WiFi infrastructure, is not installed, such calibration cannot be performed.

Therefore, a new step length estimation technique capable of estimating more precise step length information without undergoing off-line or on-line calibration is urgently required.

SUMMARY OF THE INVENTION

Accordingly, the present invention has been made keeping in mind the above problems occurring in the prior art, and an object of the present invention is to promptly and accurately estimate a step length immediately upon receiving a location request, without a separate calibration procedure, by using step length estimation model parameters received from a server during the step estimation of PDR.

Another object of the present invention is to reduce the complexity of positioning calculation performed by user equipment and provide optimal complex positioning information in combination with measurement information of an existing network or a Global Navigation Satellite System (GNSS) because user equipment including sensors provides sensor measurement information per step to a server.

In accordance with an aspect of the present invention to accomplish the above objects, there is provided a method of estimating a location of a pedestrian, including generating, by mobile User Equipment (UE) having sensors, positioning measurement information; requesting, by the mobile UE, positioning assistance information from a positioning server; generating, by the positioning server, the positioning assistance information; providing, by the positioning server, the positioning assistance information to the mobile UE; and performing, by the mobile UE, location estimation of the pedestrian using the positioning measurement information and the positioning assistance information.

Preferably, the positioning assistance information may include pedestrian states and parameters corresponding to the pedestrian states.

Preferably, requesting the positioning assistance information may be configured to send an assistance information request message including pedestrian state information and request model information of the mobile UE to the positioning server.

Preferably, the pedestrian states may include one or more of walking-horizontal, walking-down-slope, walking-up-slope, walking-up-stair, walking-down-stair, running-horizontal, running-down-slope, running-up-slope, running-up-stair, and running-down-stair.

Preferably, the parameters may include one or more of a step frequency coefficient and nominal value, a peak difference of acceleration norm coefficient and nominal value per step length, a variance of acceleration norm coefficient and nominal value per step length, a peak of gyro norm coefficient and nominal value per step length, and a variance of gyro norm coefficient and nominal value per step length.

Preferably, generating the positioning assistance information may be configured to generate the positioning assistance information in conjunction with a step length estimation parameter database (DB).

Preferably, the method may further include requesting, by the positioning server, sensor-based positioning capabilities from the mobile UE; and providing, by the mobile UE, the sensor-based positioning capabilities including one or more of capability to provide the positioning measurement information and capability to use the positioning assistance information to the positioning server.

Preferably, the method may further include providing, by the mobile UE, the positioning measurement information to the positioning server; and performing, by the positioning server, location estimation of the pedestrian using the positioning measurement information.

In accordance with another aspect of the present invention to accomplish the above objects, there is provided mobile User-Equipment (UE) including one or more sensors for generating positioning measurement information; a positioning assistance information requesting unit for requesting positioning assistance information from a positioning server; and a UE-based positioning unit for performing location estimation of a pedestrian using the positioning measurement information and the positioning assistance information.

Preferably, the mobile UE may further include a sensor-based positioning capability provision unit for providing sensor-based positioning capabilities including one or more of capability to provide the positioning measurement information and capability to use the positioning assistance information in response to a request from the positioning server.

Preferably, the mobile UE may further include a positioning measurement information provision unit for providing the positioning measurement information to the positioning server so that the positioning server performs location estimation of the pedestrian using the positioning measurement information.

In accordance with a further aspect of the present invention to accomplish the above objects, there is provided a positioning server including a positioning measurement information requesting unit for requesting positioning measurement information from mobile User Equipment (UE); a positioning assistance information provision unit for generating positioning assistance information corresponding to the mobile UE; and a server-based positioning unit for performing location estimation of a pedestrian using the positioning measurement information and the positioning assistance information.

Preferably, the positioning server may further include a step length estimation parameter database (DB) interworking unit for operating in conjunction with a step length estimation parameter DB so as to generate the positioning assistance information.

Preferably, the positioning server may further include a sensor-based positioning capability requesting unit for requesting sensor-based positioning capabilities including one or more of capability to provide the positioning measurement information and capability to use the positioning assistance information from the mobile UE; and a positioning assistance information provision unit for providing the positioning assistance information to the mobile UE.

Preferably, the server-based positioning unit may perform location estimation of the pedestrian using one or more of network measurement information and Global Navigation Satellite System (GNSS) measurement information, in addition to the positioning measurement information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, preferred embodiments of the present invention will be described in detail with reference to the attached drawings.

Figure 1:
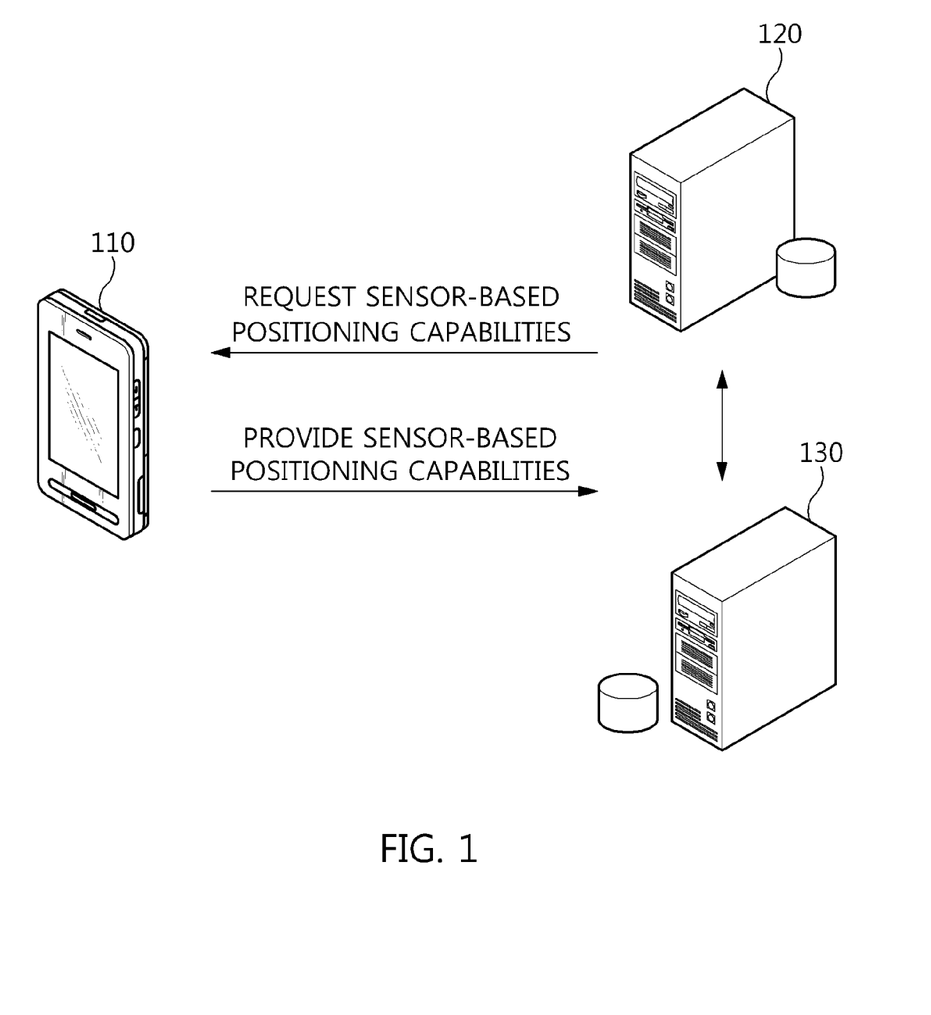
FIGS. 1 to 3 are diagrams showing a system to which a method of estimating the location of a pedestrian is applied according to an embodiment of the present invention.
Figure 2:
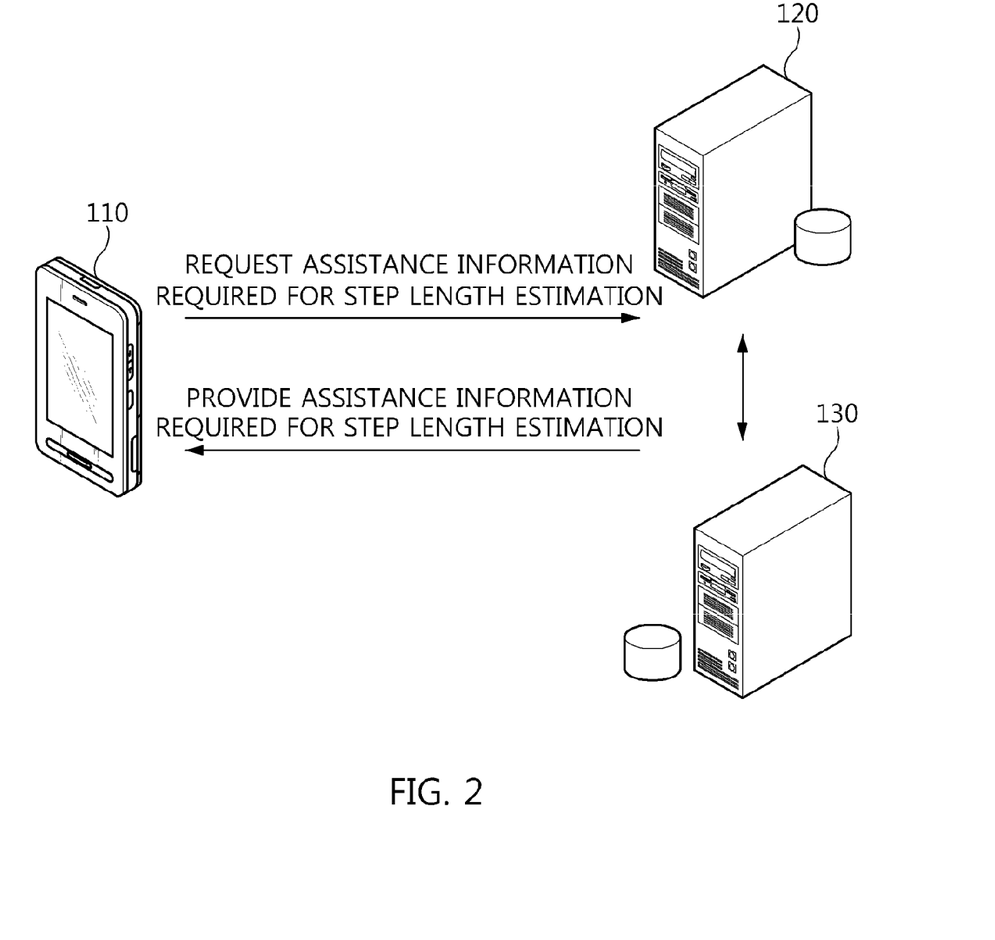
Figure 3:
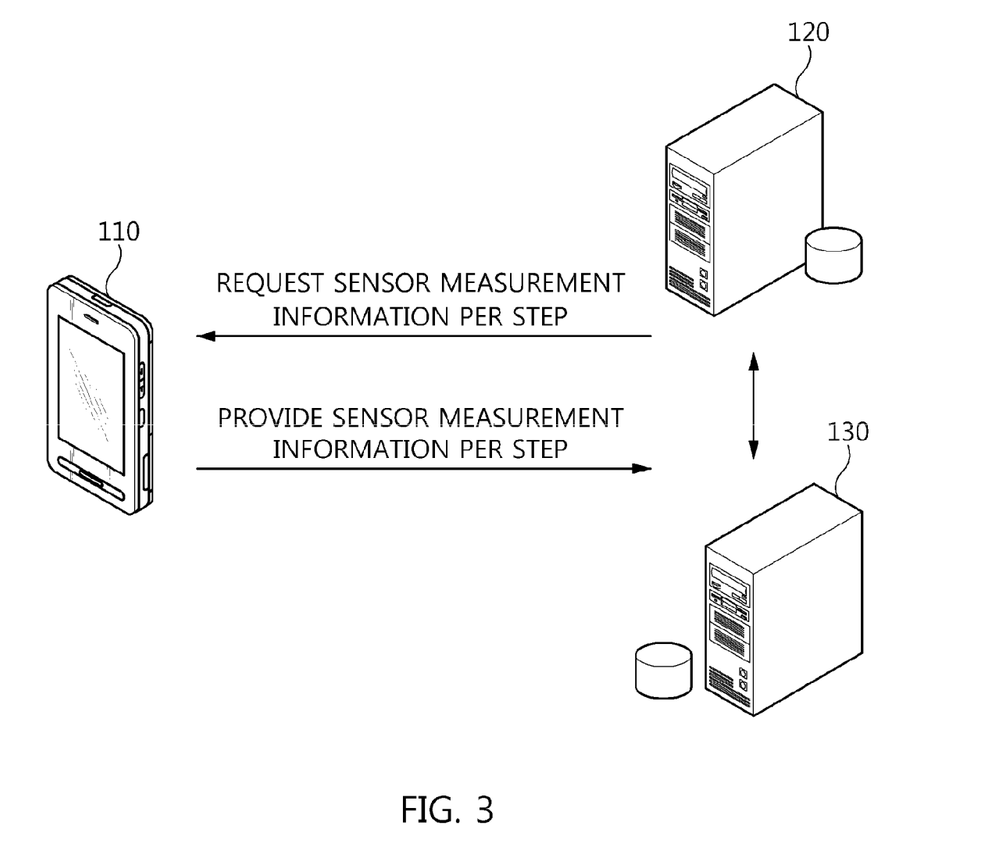

FIGS. 1 to 3 are diagrams showing a system to which a method of estimating the location of a pedestrian is applied according to an embodiment of the present invention.

Referring to FIG. 1, the system to which the pedestrian location estimation method is applied according to an embodiment of the present invention includes mobile user equipment (UE) 110 including sensors, a positioning server 120, and a step length estimation parameter database (DB) 130.

The mobile UE 110 may be a mobile communication terminal or a computing device including sensor modules, such as an accelerometer, a gyroscope, and a magnetometer, communication modules for performing data transmission/reception to/from a server, etc. For example, since smart phones, which have recently been introduced, include sensor devices, such as an accelerometer, a gyroscope, a magnetometer, and a camera, and include mobile communication modules, such as Code Division Multiple Access (CDMA), Wideband CDMA (WCDMA), Long Term Evolution (LTE), WiBro, and Femto Cell modules, or short-range communication modules, such as WiFi, Radio Frequency Identification (RFID), Near-Field Communication (NFC), and Bluetooth modules, as communication modules, they may correspond to the mobile UE shown in FIG. 1. In addition, laptop computers, such as a tablet Personal Computer (PC), a netbook, an ultrabook, or a notebook, on which sensor modules or communication modules are internally or externally mounted, may also correspond to the mobile UE shown in FIG. 1.

The positioning server 120 requests sensor-based positioning capabilities from the mobile UE 110. The mobile UE 110 provides the sensor-based positioning capabilities to the positioning server 120. In this case, such sensor-based positioning capability may be the capability to provide sensor-related positioning measurement information, or use sensor-related positioning assistance information.

In this case, the sensor-related positioning measurement information may include sensor measurement information per step, and the sensor measurement information per step may include a step frequency, a difference between maximum and minimum peaks of an accelerometer, a variance of the accelerometer, a maximum peak of a gyroscope, a variance of the gyroscope, etc. That is, the sensor-based positioning capabilities may include information about the capability to provide such sensor measurement information per step.

Here, the sensor-related positioning assistance information may include step length estimation parameters for respective pedestrian states. That is, the sensor-based positioning capabilities may include information about the capability to utilize such step length estimation parameters for respective pedestrian states.

The step length estimation parameter DB 130 may include one or more sets of step length estimation parameter models. Each step length estimation parameter model set may be composed of pedestrian states and step length estimation parameter models corresponding thereto, for each sensor manufacturer. When sensor manufacturers are different from one another, the outputs, calibration coefficients, etc. of sensors may differ depending on the standards of the respective sensor manufacturers. Even in the case of different pieces of mobile UE 110, when the sensor manufactures are the same, the same step length estimation parameter model may also be used for each pedestrian state.

Referring to FIG. 2, it can be seen that the mobile UE 110 requests positioning assistance information from the positioning server 120, and the positioning server 120 provides the positioning assistance information to the mobile UE 110 in response to the request.

Referring to FIG. 3, it can be seen that the positioning server 120 requests positioning measurement information, such as sensor measurement information per step, from the mobile UE 110, and the mobile UE 110 provides the positioning measurement information to the positioning server 120 in response to the request.

In the embodiments shown in FIGS. 1 to 3, the request and provision of the positioning capabilities of FIG. 1, the request and provision of the positioning assistance information of FIG. 2, and the request and provision of the positioning measurement information of FIG. 3 may be separately performed, or performed in conjunction with each other. Furthermore, a pair of mobile UE and a positioning server may perform all of the functions shown in FIGS. 1 to 3.

Figure 4:
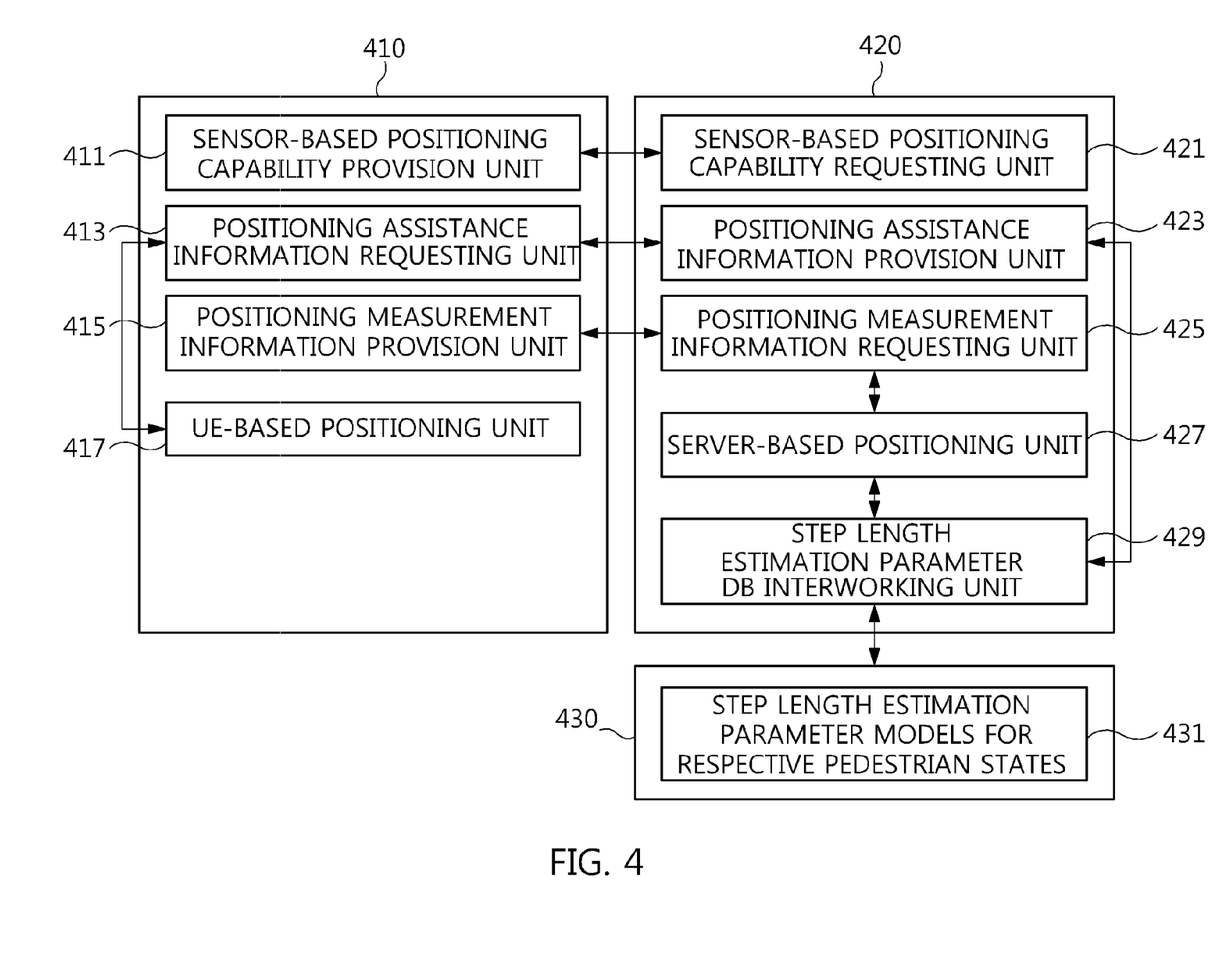
FIG. 4 is a block diagram showing the detailed configuration of mobile UE, a positioning server, and a step length estimation parameter database (DB) shown in FIG. 1.

FIG. 4 is a block diagram showing the detailed configuration of the mobile UE, the positioning server, and the step length estimation parameter DB shown in FIG. 1.

Referring to FIG. 4, mobile user equipment (UE) 410 includes a sensor-based positioning capability provision unit 411, a positioning assistance information requesting unit 413, a positioning measurement information provision unit 415, and a UE-based positioning unit 417.

The sensor-based positioning capability provision unit 411 provides the capabilities to allow the mobile UE 410 to provide sensor-related positioning measurement information to the positioning server 420 or use sensor-related positioning assistance information. In this case, the sensor-related positioning measurement information may include sensor measurement information per step, such as a step frequency, a difference between the maximum and minimum peaks of an accelerometer, the variance of the accelerometer, the maximum peak of a gyroscope, and the variance of the gyroscope. Here, the sensor-related positioning assistance information may include step length estimation parameters for respective pedestrian states.

That is, the sensor-based positioning capability provision unit 411 may provide information about the capability to provide the sensor measurement information per step or the capability to use the step length estimation parameters to the positioning server 420.

The positioning measurement information provision unit 415 functions to allow the mobile UE 410 to provide the sensor-related positioning measurement information to the positioning server 420. The sensor-related positioning measurement information may be composed of sets of one or more pieces of sensor measurement information per step, and may include sets of pieces of sensor measurement information corresponding to a previous time, as well as a current time.

The positioning assistance information requesting unit 413 functions to allow the mobile UE 410 to request sensor-related positioning assistance information from the positioning server 420.

The UE-based positioning unit 415 functions to calculate the location of the UE using the sensor-related positioning assistance information provided by the positioning server 420 and the sensor-related positioning measurement information of the mobile UE. For example, in PDR, the mobile UE 410 requests and receives step length estimation parameter models 431 for respective pedestrian states as assistance information for step length estimation from the positioning server 420, and thereafter more accurately calculates the location of the UE based on the models from the moment that a location request is received, without requiring an off-line calibration procedure.

Further, the positioning server 420 includes a sensor-based positioning capability requesting unit 421, a positioning assistance information provision unit 423, a positioning measurement information requesting unit 425, a server-based positioning unit 427, and a step length estimation parameter DB interworking unit 429.

The sensor-based positioning capability requesting unit 421 functions to allow the positioning server 420 to query the mobile UE 410 about the capability to provide sensor-related positioning measurement information or the capability to use sensor-related positioning assistance information.

The positioning measurement information requesting unit 425 functions to allow the positioning server 420 to request sensor-related positioning measurement information from the mobile UE 410.

The positioning assistance information provision unit 423 functions to allow the positioning server 420 to provide sensor-related positioning assistance information to the UE. The sensor-related positioning assistance information may include step length estimation parameters for respective pedestrian states or the like.

The server-based positioning unit 427 functions to calculate the location of the UE using the sensor measurement information provided by the mobile UE 410 or composite measurement information (measurement information in which sensors, GNSS, and the network are combined). For example, the server-based positioning unit 427 may allow the server to calculate the location of the UE using a PDR positioning method based on pieces of measurement information per step obtained by the accelerometer, the gyroscope, and the magnetometer. For example, the server-based positioning unit 427 calculates an optimal location in the current environment (indoor or outdoor environment) of the mobile UE 410 by combining all resources which may be measured by the mobile UE 410, such as WiFi measurement information (Received Signal Strength Indicator: RSSI, Angle of Arrival: AOA, or Round Trip Delay: RTD), GNSS measurement information, such as pseudo ranges or carrier phases, and network base station measurement information, such as cell identification (ID), Time Difference of Arrival (TDoA), or an RSSI pattern.

The step length estimation parameter DB interworking unit 429 functions to access an external step length estimation parameter DB 430 and receive parameter data if a step length estimation parameter DB 430 is not present in the positioning server 420.

Further, the step length estimation parameter DB 430 may include step length estimation parameter models 431 for respective pedestrian states.

The step length estimation parameter DB 430 may be either provided in the positioning server 420 or provided as an independent server outside the positioning server 420. The step length estimation parameter DB 430 may include one or more step length estimation parameter model sets. Each step length estimation parameter model set may be composed of pedestrian states and step length estimation parameter models corresponding thereto, for each sensor manufacturer. Generally, when sensor manufacturers are different from one another, the outputs, calibration coefficients, etc. of sensors may differ depending on the standards of the respective sensor manufacturers. Even in the case of different pieces of mobile UE, when the sensor manufactures are the same, the same step length estimation parameter model may also be used for each pedestrian state.

Here, the pedestrian states denote the motional states of a pedestrian having the mobile UE, and may be composed of, for example, walking-horizontal, walking-down-slope, walking-up-slope, walking-up-stair, walking-down-stair, running-horizontal, running-down-slope, running-up-slope, running-up-stair, running-down-stair, etc.

The step length estimation parameter models 431 are composed of elements used to estimate a step length, and may include the step frequency coefficient and nominal value corresponding to each pedestrian state, the peak difference of acceleration norm coefficient and nominal value per step length, the variance of acceleration norm coefficient and nominal value per step length, the peak of gyro norm coefficient and nominal value per step length, the variance of gyro norm coefficient and nominal value per step length, etc.

Based on the configuration shown in FIG. 4, the location of the UE can be calculated using a UE-based PDR positioning method (UE-based PDR) or a UE-assisted PDR positioning method (UE-assisted PDR).

Among the components shown in FIG. 4, the positioning assistance information requesting unit 413, the positioning assistance information provision unit 423, and the UE-based positioning unit 417 are components used for the UE-based PDR positioning method. In this case, the step length estimation parameter DB interworking unit 429 may provide step length estimation parameters for the UE-based positioning method to the positioning assistance information provision unit 423.

For the UE-based PDR positioning, the sensor-based positioning capability requesting unit 421 of the positioning server 420 and the sensor-based positioning capability provision unit 411 of the mobile UE 410 determine whether the mobile UE 410, the location of which is desired to be calculated, supports sensor-based positioning while communicating with each other. If it is determined that the sensor-based positioning may be supported, the positioning assistance information requesting unit 413 requests sensor-related positioning assistance information (for example, step length estimation parameter models for respective pedestrian states) from the positioning server 420. The positioning server that received the request is configured to, if the corresponding assistance information is present in the form of the step length estimation parameter DB 430 outside the server, generate assistance information in conjunction with the external step length estimation parameter DB 430 through the step length estimation parameter DB interworking unit 429. When the corresponding assistance information is present in the positioning server 420, the step length estimation parameter DB interworking unit 429 is not operated.

Finally generated sensor-related positioning assistance information is provided to the UE-based positioning unit 417 of the mobile UE 410, so that the UE-based positioning unit 417 may perform UE-based PDR positioning. In this case, the sensor-related positioning assistance information may be provided to the UE-based positioning unit 417 through the positioning measurement information provision unit 415.

Among the components shown in FIG. 4, the positioning measurement information provision unit 415, the positioning measurement information requesting unit 425, and the server-based positioning unit 427 are components used for the UE-assisted PDR positioning method. In this case, the step length estimation parameter DB interworking unit 429 may provide step length estimation parameters for the UE-assisted PDR positioning method to the server-based positioning unit 427.

For UE-assisted PDR positioning, the sensor-based positioning capability requesting unit 421 of the positioning server 420 and the sensor-based positioning capability provision unit 411 of the mobile UE 410 determine whether the mobile UE 410, the location of which is desired to be calculated, supports sensor-based positioning while communicating with each other. If it is determined that the mobile UE 410 may support sensor-based positioning, the positioning measurement information requesting unit 425 of the positioning server 420 requests and receives sensor-related positioning measurement information (e.g., sensor measurement information per step) from the positioning measurement information provision unit 415 of the mobile UE 410. The server-based positioning unit 427 performs UE-assisted PDR positioning using both the received measurement information and the assistance information received from the step length estimation parameter DB 430.

In the embodiment of FIG. 4, the sensor-based positioning capability provision unit 411, the sensor-based positioning capability requesting unit 421, the step length estimation parameter DB interworking unit 429, and the step length estimation parameter models 431 for respective pedestrian states are components used in common for the UE-based PDR positioning method and the UE-assisted PDR positioning method.

Figure 5:
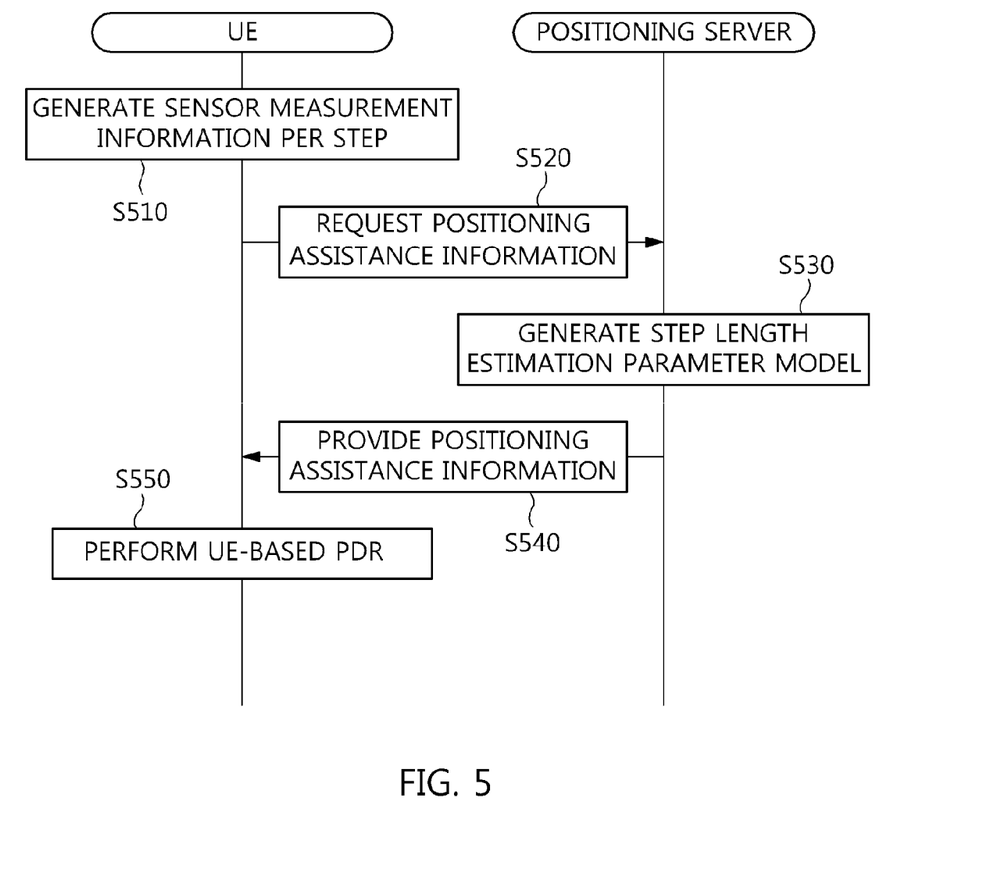
FIG. 5 is an operation flowchart showing a user equipment-based method of estimating the location of a pedestrian according to an embodiment of the present invention.

FIG. 5 is an operation flowchart showing a UE-based method of estimating the location of a pedestrian according to an embodiment of the present invention.

Referring to FIG. 5, a mobile terminal (UE) generates sensor measurement information per step at step S510.

In this case, the sensor measurement information may include a walking frequency (WF), an accelerometer magnitude (AM) or an accelerometer variance (AV), a gyro magnitude (GM) or a gyro variance (GV), etc.

Further, the positioning server provides the created step length estimation parameter model to the mobile UE at step S540.

The mobile UE performs UE-based PDR using the provided step length estimation parameter model, and then calculates the relative location of the UE at step S550.

In this case, a step count, a step length, and direction (heading) information may be used to calculate the relative location of the UE.

Figure 6:
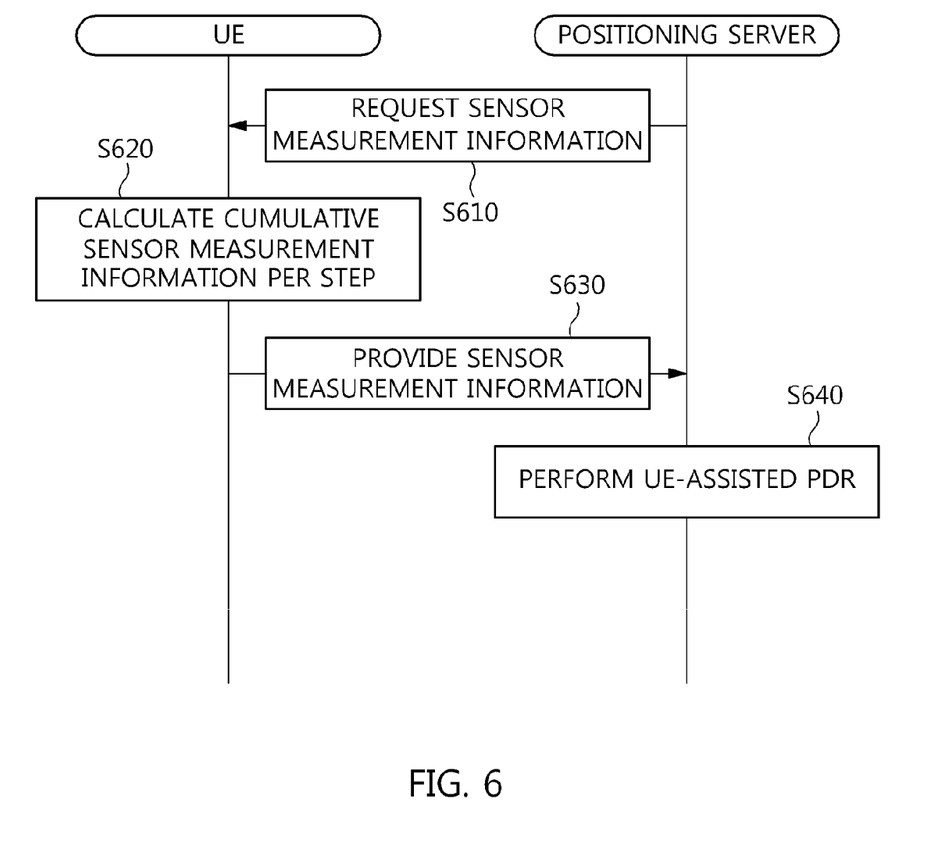
FIG. 6 is an operation flowchart showing a user equipment-assisted method of estimating the location of a pedestrian according to an embodiment of the present invention.

FIG. 6 is an operation flowchart showing a UE-assisted method of estimating the location of a pedestrian according to an embodiment of the present invention.

Referring to FIG. 6, the positioning server requests sensor measurement information from the mobile UE at step S610.

In response to the request from the positioning server, the mobile UE calculates cumulative sensor measurement information per step at step S620.

Here, the cumulative sensor measurement information per step may include a timestamp, a step count, direction (heading) information, an accelerometer magnitude (AM) or an accelerometer variance (AV) and a gyro magnitude (GM) or a gyro variance (GV).

The mobile UE provides the sensor measurement information to the positioning server at step S630. In this case, the sensor measurement information may be a set of {timestamp, step count, heading information, and AM or AV} per step.

The positioning server performs UE-assisted PDR using the received sensor measurement information at step S640.

Here, step S640 may include the step of estimating a step length using the sensor measurement information, and the step of calculating a relative location using the estimated step length. Here, the step of estimating the step length using the sensor measurement information may be configured to estimate the step length by matching the timestamp, the step count, and the AM/AV with the step length model. In this case, the step of calculating the relative location may be configured to calculate the relative location using the step count, the step length, and the heading information.

The following pseudocode 1 shows an example of a message by which the mobile UE requests assistance information for step length estimation as sensor-based positioning assistance information from the positioning server.

[pseudocode 1]

```
-- ASN1START
OMA-LPPe-Sensor-RequestAssistanceData ::= SEQUENCE {
    pedestrianStateReq          OMA-LPPe-Sensor-PedestrianState-List  OPTIONAL,
    stepLengthEstimationModelReq   OMA-LPPe-Sensor-StepLengthEstimationModel-List
    OPTIONAL,
    ...
}
-- ASN1STOP
```

Further, the mobile UE requests positioning assistance information from the positioning server at step S520.

Here, the positioning assistance information request may include a group identifier of a sensor (sensorGroupID), a pedestrian state (reqMotionState), a request model (reqModel), etc.

The positioning server creates a step length estimation parameter model in response to the request received from the mobile UE at step S530.

In this case, step S530 may create the step length estimation parameter model using the information (sensorGroupID, reqMotionState, reqModel) provided at step S520.

In pseudocode 1, OMA-LPPe-Sensor-RequestAssistanceData denotes a message used to request sensor-based positioning assistance information.

Further, pedestrianStateReq is included by the target to request pedestrian states for which step estimation model is provided. The requested types of information are indicated using a bit string with the following bit assignments. A bit value of one indicates the information type is requested and a bit value of zero indicates it is not requested.

'walking horizontal' indicates that the reception of a step estimation model for walking-horizontal has been requested.

'walking-up-slope' indicates that the reception of a step estimation model for walking-up-slope has been requested.

'walking-down-slope' indicates that the reception of a step estimation model for walking-down-slope has been requested.

'walking-up-stair' indicates that the reception of a step estimation model for walking-up-stair has been requested.

'walking-down-stair' indicates that the reception of a step estimation model for walking-down-stair has been requested.

'running-horizontal' indicates that the reception of a step estimation model for running-horizontal has been requested.

'running-up-slope' indicates that the reception of a step estimation model for running-up-slope has been requested.

'running-down-slope' indicates that the reception of a step estimation model for running-down-slope has been requested.

'running-up-stair' indicates that the reception of a step estimation model for running-up-stair has been requested.

'running-down-stair' indicates that the reception of a step estimation model for running-down-stair has been requested.

Further, stepLengthEstimationModelReq is included by the target to request information for step estimation model.

The requested types of information are indicated using a bit string with the following bit assignments. A bit value of one indicates the information type is requested and a bit value of zero indicates it is not requested.

'stepfreq' indicates whether the target requests receipt of the step frequency coefficient and nominal value.

'peakdiffAccel' indicates whether the target requests receipt of the peak difference of (3-axis) acceleration norm coefficient and nominal value.

'varAccel' indicates whether the target requests receipt of the variance of 3-axis acceleration norm coefficient and nominal value.

'peakGyro' indicates whether the target requests receipt of the peak of 3-axis gyro norm coefficient and nominal value.

'varGyro' indicates whether the target requests receipt of the variance of 3-axis gyro norm coefficient and nominal value.

The following pseudocode 2 shows an example of a message by which the positioning server provides assistance information for step length estimation as sensor-based positioning assistance information to the mobile UE.

[pseudocode 2]

```
-- ASN1START
OMA-LPPe-Sensor-ProvideAssistanceData ::= SEQUENCE {
    stepLengthEstimationModel OMA-LPPe-Sensor-StepLengthEstimationModeList OPTIONAL,
    ...
}
-- ASN1STOP
```

In pseudocode 2, OMA-LPPe-Sensor-ProvideAssistanceData denotes a message used to provide sensor-based positioning assistance information.

'OMA-LPPe-Sensor-StepLengthEstimationModelList' may consist of multiple step length estimation model sets. For example, this list may consist of up to 16 models. Each step length estimation model set may include pedestrian state and associated step length estimation parameters.

For example, three subsequent models, each with different pedestrian state, may result in totally three different pedestrian applicable step length estimation models.

The following pseudocode 3 shows an example of a step length estimation model list (OMA-LPPe-Sensor-StepLengthEstimationModelList) included in a message required to provide the assistance information for step length estimation.

[pseudocode 3]

```
-- ASN1START
OMA-LPPe-Sensor-StepLengthEstimationModelList     ::=     SEQUENCE (SIZE
(1..maxStepLengthEstimationModelSets)) OF
OMA-LPPe-Sensor-StepLengthEstimationModelSet
OMA-LPPe-Sensor-StepLengthEstimationModelSet ::= SEQUENCE {
    pedestrianState ENUMERATED {
                                walking-horizontal,
                                walking-up-slope,
                                walking-down-slope,
                                walking-step-up,
                                walking-step-down,
                                running-horizontal,
                                running-up-slope,
                                running-down-slope,
```

[pseudocode 3]

```
                              running-step-up,
                              running-step-down,
                              ...
                              },
        stepLengthEstimationModel SEQUENCE {
                stepfreqCoeff           INTEGER (0..127),
                stepfreqNominalVal      INTEGER (0..511),
                peakdiffAccelCoeff      INTEGER (0..255)    OPTIONAL,
                peakdiffAccelNominalVal INTEGER (0..255)    OPTIONAL,
                varAccelCoeff           INTEGER (0..255)    OPTIONAL,
                varAccelNominalVal      INTEGER (0..255)    OPTIONAL,
                peakGyroCoeff           INTEGER (0..4095)   OPTIONAL,
                peakGyroNominalVal      INTEGER (0..511)    OPTIONAL,
                varGyroCoeff            INTEGER (0..1022)   OPTIONAL,
                varGyroNominalVal       INTEGER (0..1022)   OPTIONAL,
                ...
        },
        ...
}
maxStepLengthEstimationModelSets        INTEGER ::= 16
-- ASN1STOP
```

In pseudocode 3, pedestrianState specifies the pedestrian state for which the step length estimation models are applicable Further, 'stepfreqCoeff' specifies the step frequency coefficient which linearly relates the change of step frequency to the change of step length from the nominal value of step frequency in the selected pedestrian state. For example, the scale factor of stepfreqCoeff may be $10^{-2}$ m/Hz, and the range thereof may be [0, 1.28) m/Hz.

'stepfreqNominalVal' specifies the nominal value of step frequency in the selected pedestrian state. For example, the scale factor of stepfreqNominalVal may be $10^{-2}$ Hz and the range thereof may be [0, 5.12) Hz.

'peakdiffAccelCoeff' specifies the peak difference of 3-axis acceleration norm coefficient which linearly relates the change of peak difference of 3-axis acceleration norm to the change of step length from the nominal value of peak difference of 3-axis acceleration norm in the selected pedestrian state. The peak difference of 3-axis acceleration norm means the difference between maximum and minimum 3-axis acceleration norm values during each step. For example, the scale factor of peakdiffAccelCoeff may be $10^{-3}$ m/(m/s$^2$) and the range thereof may be [0, 0.256) m/(m/s$^2$).

'peakdiffAccelNominalVal' specifies the nominal value of peak difference of 3-axis acceleration norm in the selected pedestrian state. For example, the scale factor of peakdiffAccelNominalVal may be $10^{-1}$ m/s$^2$ and the range thereof may be [0, 25.6) m/s$^2$.

'valAccelCoeff' specifies the variance of 3-axis acceleration norm coefficient which linearly relates the change of the variance of 3-axis acceleration norm to the change of step length from the nominal value of the variance of 3-axis acceleration norm in the selected pedestrian state. For example, the scale factor of valAccelCoeff may be $10^{-3}$ m/(m/s$^2$)$^2$ and the range thereof may be [0, 0.256) m/(m/s$^2$)$^2$.

'valAccelNominalVal' specifies the nominal value of the variance of 3-axis acceleration norm in the selected pedestrian state. For example, the scale factor of valAccelNominalVal may be 1(m/s$^2$)$^2$ and the range thereof may be [0, 256)(m/s$^2$)$^2$.

'peakGyroCoeff' specifies the peak of 3-axis gyro norm coefficient which linearly relates the change of peak of 3-axis gyro norm to the change of step length from the nominal value of peak of 3-axis gyro norm in the selected pedestrian state. For example, the scale factor of peakGyroCoeff may be $10^{-3}$ m/(rad/s) and the range thereof may be [0, 4.096) m/(rad/s).

'peakGyroNominalVal' specifies the nominal value of peak of 3-axis gyro norm in the selected pedestrian state. For example, the scale factor of peakGyroNominalVal may be $10^{-2}$ rads and the range thereof may be [0, 5.12) rad/s.

'valGyroCoeff' specifies the variance of 3-axis gyro norm coefficient which linearly relates the change of the variance of 3-axis gyro norm to the change of step length from the nominal value of the variance of 3-axis gyro norm in the selected pedestrian state. For example, the scale factor of valGyroCoeff may be $10^{-1}$ m(rad/s)$^2$ and the range thereof may be [0, 102.3) m/(rad/s)$^2$.

'valGyroNominalVal' specifies the nominal value of the variance of 3-axis gyro norm in the selected pedestrian state. For example, the scale factor of valGyroNominalVal may be $10^{-2}$(rad/s)$^2$ and the range thereof may be [0, 10.23)(rad/s)$^2$.

The following pseudocode 4 shows an example of a message by which the positioning server requests sensor-based positioning capabilities from the mobile UE.

[pseudocode 4]

```
-- ASN1START
        OMA-LPPe-Sensor-RequestCapabilities ::= SEQUENCE {
        ...
        }
-- ASN1STOP
```

The following pseudocode 5 shows an example of a message by which the mobile UE provides sensor-based positioning capabilities to the positioning server.

[pseudocode 5]

```
-- ASN1START
OMA-LPPe-Sensor-ProvideCapabilities ::= SEQUENCE {
    pedestrianStateSupport            OMA-LPPe-Sensor-PedestrianState-List  OPTIONAL,
    stepLengthEstimationModelSupport  OMA-LPPe-Sensor-StepLengthEstimationModel-List OPTIONAL,
    ...
}
-- ASN1STOP
```

In the above pseudocode 4, 'OMA-LPPe-Sensor-ProvideCapabilities' is used to provide sensor-based positioning capabilities.

In pseudocode 5, 'OMA-LPPe-Sensor-PedestrianState-List' provides a list of one or more pedestrian states.

'OMA-LPPe-Sensor-StepLengthEstimationModel-List' may include a field for sensorTechnologies. 'sensorTechnologies' denotes specific sensor technologies and may have the following values.

'accel' specifies the sensor technology is accelerometer (IEEE 802.15.1).

'gyro' specifies the sensor technology is gyroscope (NFC1 and NFC2).

'mag' specifies the sensor technology is magnetometer (OMA-MC).

The following pseudocode 6 shows an example of OMA-LPPe-Sensor-PedestrianState-List.

[pseudocode 6]

```
-- ASN1START
OMA-LPPe-Sensor-PedestrianState-List ::= BIT STRING {
    walking-horizontal      (0),
    walking-up-slope        (1),
    walking-down-slope      (2),
    walking-up-stair        (3),
    walking-down-stair      (4),
    running-horizontal      (5),
    running-up-slope        (5),
    running-down-slope      (7),
    running-up-stair        (8),
    running-down-stair      (9)) (SIZE (1..16))
-- ASN1STOP
```

The following pseudocode 7 shows an example of OMA-LPPe-Sensor-StepLengthEstimationModel-List of pseudocode 5.

[pseudocode 7]

```
-- ASN1START
OMA-LPPe-Sensor-StepLengthEstimationModel-List ::= BIT STRING {
    stepfreq        (0),
    peakdiffAccel   (1),
    varAccel        (2),
    peakGyro        (3),
    varGyro         (4)) (SIZE(1..8))
-- ASN1STOP
```

In pseudocode 7, OMA-LPPe-Sensor-StepLengthEstimationModel-List denotes a list of one or more sensor types. A type is present if the associated bit is set to one and absent if set to zero.

In accordance with the present invention, there is an advantage in that when UE including sensors, such as an accelerometer, a gyroscope, and a magnetometer, calculates a location through a Pedestrian Dead Reckoning (PDR) method of estimating a step count, a step length, and heading information using the sensors, the UE receives step length estimation model parameters from a server and uses the model parameters, thus calculating the location using UE-based PDR immediately upon receiving a location request without performing an additional calibration procedure in the UE.

Further, the present invention is advantageous in that UE including sensors may provide sensor measurement information per step to the server, thus calculating the location using UE-assisted PDR.

As described above, in the method and apparatus for estimating the location of a pedestrian according to the present invention, the configurations and schemes in the above-described embodiments are not limitedly applied, and some or all of the above embodiments can be selectively combined and configured so that various modifications are possible.

What is claimed is:

1. A method of estimating a location of a pedestrian, comprising:
    requesting, by a positioning server, sensor-based positioning capabilities from a mobile User Equipment (UE) having sensors;
    providing, by the mobile UE, the sensor-based positioning capabilities including at least one of a capability to provide the positioning measurement information and a capability to use the positioning assistance information to the positioning server;
    generating, by the mobile UE having sensors, positioning measurement information;
    requesting, by the mobile UE, positioning assistance information from the positioning server;
    generating, by the positioning server, the positioning assistance information;
    providing, by the positioning server, the positioning assistance information to the mobile UE; and
    performing, by the mobile UE, location estimation of the pedestrian using the positioning measurement information and the positioning assistance information,
    wherein the positioning assistance information includes pedestrian states and parameters corresponding to the pedestrian states,
    wherein the pedestrian states include at least one of walking-horizontal, walking-down-slope, walking-up-slope, walking-up-stair, walking-down-stair, running-horizontal, running-down-slope, running-up-slope, running-up-stair, and running-down-stair,
    wherein the parameters include at least one of a step frequency coefficient and nominal value, a peak difference of acceleration norm coefficient and nominal value per step length, a variance of acceleration norm coefficient and nominal value per step length, a peak of gyro norm coefficient and nominal value per step length, and a variance of gyro norm coefficient and nominal value per step length, and wherein requesting the positioning assistance information includes sending an assistance information request message including pedestrian state information and request model information of the mobile UE to the positioning server.

2. The method of claim 1, wherein the positioning assistance information is generated using a step length estimation parameter database (DB).

3. The method of claim 1, further comprising:
providing, by the mobile UE, the positioning measurement information to the positioning server; and
performing, by the positioning server, location estimation of the pedestrian using the positioning measurement information.

4. The method of claim 1, wherein the assistance information request message includes an indication of a pedestrian state.

5. A mobile User-Equipment (UE) comprising:
at least one sensor for generating positioning measurement information;
a positioning assistance information requesting unit for requesting positioning assistance information from a positioning server;
a UE-based positioning unit for performing location estimation of a pedestrian using the positioning measurement information and the positioning assistance information; and
a sensor-based positioning capability provision unit for providing sensor-based positioning capabilities including at least one of a capability to provide the positioning measurement information and a capability to use the positioning assistance information in response to a request from the positioning server,
wherein the positioning assistance information includes pedestrian states and parameters corresponding to the pedestrian states, wherein the pedestrian states include at least one of walking-horizontal, walking-down-slope, walking-up-slope, walking-up-stair, walking-down-stair, running-horizontal, running-down-slope, running-up-slope, running-up-stair, and running-down-stair,
wherein the parameters include at least one of a step frequency coefficient and nominal value, a peak difference of acceleration norm coefficient and nominal value per step length, a variance of acceleration norm coefficient and nominal value per step length, a peak of gyro norm coefficient and nominal value per step length, and a variance of gyro norm coefficient and nominal value per step length, and
wherein the positioning assistance information requesting unit requests the positioning assistance information by sending an assistance information request message including pedestrian state information and request model information of the mobile UE to the positioning server.

6. The mobile UE of claim 5, further comprising:
a positioning measurement information provision unit configured to provide the positioning measurement information to the positioning server so that the positioning server performs location estimation of the pedestrian using the positioning measurement information.

7. The mobile UE of claim 5, wherein the assistance information request message includes an indication of a pedestrian state.

8. A positioning server comprising:
a positioning measurement information requesting unit for requesting positioning measurement information from a mobile User Equipment (UE);
a positioning assistance information provision unit for generating positioning assistance information corresponding to the mobile UE;
a server-based positioning unit for performing location estimation of a pedestrian using the positioning measurement information and the positioning assistance information;
a sensor-based positioning capability requesting unit for requesting sensor-based positioning capabilities including at least one of a capability to provide the positioning measurement information and a capability to use the positioning assistance information from the mobile UE;
a positioning assistance information provision unit for providing the positioning assistance information to the mobile UE; and
a step length estimation parameter database (DB) interworking unit for operating in conjunction with a step length estimation parameter DB so as to generate the positioning assistance information,
wherein the positioning assistance information includes pedestrian states and parameters corresponding to the pedestrian states,
wherein the pedestrian states include at least one of walking-horizontal, walking-down-slope, walking-up-slope, walking-up-stair, walking-down-stair, running-horizontal, running-down-slope, running-up-slope, running-up-stair, and running-down-stair, and
wherein the parameters include at least one of a step frequency coefficient and nominal value, a peak difference of acceleration norm coefficient and nominal value per step length, a variance of acceleration norm coefficient and nominal value per step length, a peak of gyro norm coefficient and nominal value per step length, and a variance of gyro norm coefficient and nominal value per step length.

9. The positioning server of claim 8, wherein the server-based positioning unit performs location estimation of the pedestrian using at least one of network measurement information and Global Navigation Satellite System (GNSS) measurement information, in addition to the positioning measurement information.

* * * * *